May 13, 1947.  W. J. MORRILL  2,420,553
TORQUE LIMITING DRIVING MECHANISM
Filed Dec. 5, 1942
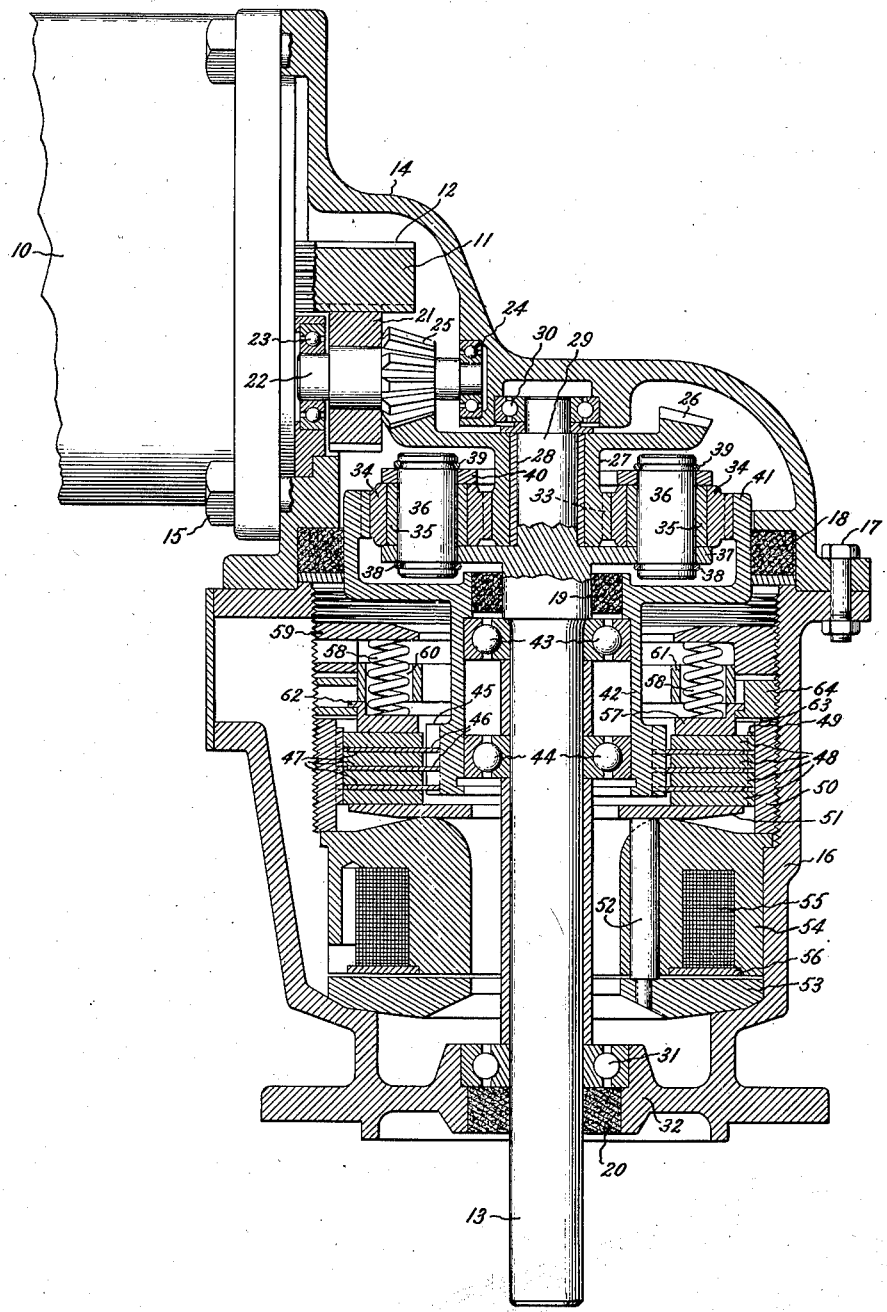
Inventor:
Wayne J. Morrill,
by Harry E. Dunham
His Attorney.

Patented May 13, 1947

2,420,553

UNITED STATES PATENT OFFICE 2,420,553

TORQUE LIMITING DRIVING MECHANISM

Wayne J. Morrill, Fort Wayne, Ind., assignor to General Electric Company, a corporation of New York Application December 5, 1942, Serial No. 467,984

29 Claims. (Cl. 74—291)

My invention relates to driving mechanisms and particularly to a driving mechanism in which a unit is arranged to provide a driving connection between the driving and driven shafts and also to limit the torque transmitted through the driving connection between these shafts to a predetermined safe operating value.

An object of my invention is to provide an improved driving mechanism having a single unit for providing a driving connection and also for limiting the torque transmitted through the driving connection to a predetermined value.

Another object of my invention is to provide an improved driving mechanism wherein one of the gears of a planetary system is adapted to be held to provide a driving connection between a driving and driven shaft when the driven shaft is operating and to limit the torque transmitted through the driving connection to a predetermined safe operating value.

Further objects and advantages of my invention will become apparent and my invention will be better understood from the following description referring to the accompanying drawing, and the features of novelty which characterize my invention will be pointed out with particularity in the claims annexed to and forming part of this specification.

The drawing is a partial sectional view showing an embodiment of my invention in which a planetary gear system is adapted to provide a driving connection between a motor drive shaft and a driven shaft and an electromagnetic clutch is adapted to limit the torque transmitted by the driving connection to a predetermined value and also to provide the driving connection only when the motor is energized.

Referring to the drawing, I have shown a driving mechanism in which a motor 10 is arranged as a driving member and is provided with a drive shaft 11 on which spur gear teeth 12 are formed. The motor is provided with conventional windings adapted to be energized by a suitable source of electrical power supply and is adapted to provide a driving torque to a driven shaft 13 through a set of gearing which engages the spur gear 12. The gearing is mounted in a gear casing 14 which is rigidly secured to the frame of the motor 10 by bolts 15 and is secured to a brake housing 16 by bolts 17. Suitable sealing bushings 18, 19, and 20 are arranged about the relatively movable parts of the driving mechanism to insure against the entrance of foreign substances which might interfere with the proper operation thereof. The torque is transmitted from the motor shaft 11 to the driven shaft member 13 by gearing which includes an intermediate spur gear 21 arranged in engagement with the drive shaft gear 12 and mounted on a countershaft 22 supported by ball bearings 23 and 24 in the gear casing 14. A bevel gear 25 is formed integral with the countershaft 22 so as to be driven by the intermediate gear 21 and is arranged in engagement with a second bevel gear 26 formed on a hub or sleeve 27 provided with a bearing 28 arranged about an upper extension 29 of the driven shaft member 13. The driven shaft is rotatably supported by anti-friction ball bearings 30 mounted in the gear casing 14 and anti-friction ball bearings 31 mounted in a bearing housing 32 formed in the brake housing 16. Torque is adapted to be transmitted from the bevel gear 26 to the driven shaft 13 through a planetary gearing system which includes a sun gear 33 formed on the hub 27 and arranged in engagement with a pair of planet gears 34 rotatably supported on the driven shaft 13 by bearings 35 arranged about shafts 36 secured to a torque arm or planet cage 37 by clamping rings 38 and 39 and a cover plate 40. The planet cage 37 is formed integral with the driven shaft 13, and torque is adapted to be transmitted from the sun gear 33 to the rotatable planet gears 34 which are adapted to drive the driven shaft 13 by engagement with an internal ring gear 41 adapted to be held stationary through an adjustably preloaded slip clutch. In order to insure against damage to the driven mechanism, the ring gear 41 is adapted to be held stationary below a predetermined torque to provide a driving connection between the sun gear 33 and the driven shaft 13 through the planet gears and the supporting planet cage 37 and to be released above a predetermined torque to allow for rotation of the ring gear 41 by the planet gears 34, thereby releasing the driving connection between the motor drive shaft 11 and the driven shaft 13. This holding and releasing mechanism includes a single slip brake which is adapted to be operated only when the motor shaft 11 is operated. The ring gear 41 is formed integral with a sleeve or quill shaft 42 rotatably supported by bearings 43 and 44 about the driven shaft 13. A splined shoulder 45 is formed on the quill shaft 42 and is engaged by complementary tongue and groove portions 46 of friction brake plates 47. The friction brake plates 47 are arranged between cooperating brake plates 48 which are provided with tongue and groove portions on their outer peripheries arranged in engagement with a complementary splined inner surface 49 formed on an adjustable brake plate supporting ring 50. These brake plates are adapted to be operated by an electromagnetic actuating member which includes a brake actuating and supporting plate 51 arranged in engagement with one of the outer brake plates 48 and provided with a plurality of operating rods 52 secured to the actuating plate 51 and to an armature 53 formed of magnetic material. The actuating plate 51 and the rods 52 are formed of non-magnetic material so that they will not be affected by the excitation of the electromagnetic brake. The armature 51 is adapted to be actuated by magnetic attraction of a U-section electromagnetic core 54 which is excited by an exciting winding 55 connected in circuit with the windings of the motor 10 and adapted to be energized only when the motor is energized. A retaining ring 56 of non-magnetic material is arranged over the lower side of the exciting coil 55 to retain the coil in position and to exclude foreign substances from the coil enclosure. In order to provide for a release of the driving connection between the motor shaft 11 and the driven shaft 13 above a predetermined torque, the electromagnetic brake is provided with a pressure plate 57 which is arranged to engage the outer side of the brake plate 48 opposite the actuating brake plate 51. This pressure plate 57 is resiliently biased and preloaded by a plurality of coil springs 58 arranged in circumferentially spaced apart relationship in engagement with the outer surface of the pressure plate 57 and an adjustable preloading spring seat and retaining plate 59. These springs are guided and held in their relative positions by openings 60 formed in a guiding ring 61 which is arranged between the pressure plate 51 and the spring seat plate 59 and adapted to move axially relative to the spring seat plate 59. The pressure plate 57 is formed with an outwardly extending flange 62 which is adapted to be biased by the springs 58 against a complementary flange 63 formed on a retaining ring 64 to limit the lowermost position of the pressure plate 57. The retaining ring is formed to act as a guide for the pressure plate 57 and to provide for limited axial movement of the pressure plate 57 relative to the brake plates 48. An adjustment of the pressure plate 57 to provide for wear in the brake plates 46 and 48 is provided for by the threaded engagement of the pressure plate 57 with the threaded internal surface of the brake housing 16. When the motor 10 is energized, the exciting coil 55 of the electromagnetic brake also is arranged to be energized, so as to excite the brake core 54 and attract the armature 53 toward the core 54 to close an air gap existing therebetween when the coil 55 is deenergized. Under these conditions, the armature 53 moves axially and exerts a pressure against the actuating brake plate 51 through the rods 52 which in turn exerts a pressure against the brake plates 48, biasing them toward the pressure plate 57 against the pressure of the biasing springs 58. This tends to exert a predetermined pressure by the brake plates 48 on the complementary brake plates 48 which tend to hold stationary the quill shaft 42 and consequently the ring gear 41. This causes the planet gears 34 to rotate about their supporting shafts 46 due to the rotation of the sun gear 33 by the gearing connected to the motor shaft 11, and thereby drives the driven shaft 13 through the planet cage 37 and the planet supporting shafts 46. If for any reason the load on the driven shaft 13 becomes excessive and exceeds a predetermined value, the friction between the brake plates 46 and 48 will not be sufficient to hold stationary the quill shaft 42 and consequently will release the ring gear 41 and rotation of the sun gear 33 will merely result in a rotation of the planet gears 34 about their supporting shafts 36 and a rotation of the ring gear 41 about the sun gear 33, without any resultant rotation of the planet cage 37 or the driven shaft 13, thereby releasing the driving connection between the motor drive shaft 11 and the driven shaft 13. The torque at which the ring gear 41 will be released can be adjusted by adjusting the position of the spring seat plate 59 within the brake housing 16 by adjusting the relative axial position thereof. This is facilitated by providing a threaded engagement between the outer surface of the spring seat plate 59 and the inner threaded surface of the brake housing 16. Thus the single electrically operated brake provides for connecting the driven load to the driving motor and also provides a load limiting arrangement which assures against the transmission of destructive torques by permitting slippage of the brake above predetermined safe loads. This combination of two functions is made possible by the particular arrangement of the electromagnetic brake and its electrical control responsive to the energization or operation of the motor 10.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A driving mechanism including an electric driving motor and a driven member, and an adjustably preloaded brake means operable in response to the energization of said motor for providing a driving connection between said motor and said driven member below a predetermined torque and for releasing said driving connection above said predetermined torque when said motor is energized, said preloaded brake means including means for biasing said brake toward braking position with a predetermined pressure to provide for release of said brake above said predetermined torque.

2. A driving mechanism including an electric driving motor and a driven member, and an adjustably preloaded single electromagnetic brake means operable in response to the energization of said motor for providing a driving connection between said motor and said driven member below a predetermined torque and for releasing said driving connection above said predetermined torque when said motor is energized, said preloaded brake means including means for biasing said brake toward braking position with a predetermined pressure to provide for release of said brake above said predetermined torque.

3. A driving mechanism including a driving means and a driven member, and electromagnetic preloaded means operable in response to operation of said driving means for providing a driving connection between said driving means and said driven member below a predetermined torque when said driving means is in operation and for releasing said driving connection above said predetermined torque, said preloaded brake means including means for biasing said brake toward braking position with a predetermined pressure to provide for release of said brake above said predetermined torque.

4. A driving mechanism including an electric motor and a driven member, and preloaded electromagnetic means operable in response to energization of said driving motor for providing a driving connection between said motor and said driven member below a predetermined torque and for releasing said driving connection above said predetermined torque all when said motor is energized.

5. A driving mechanism including a driving means and a driven member, and resiliently preloaded electromagnetic means operable in response to operation of said driving means for providing a driving connection between said driving means and said driven member below a predetermined torque when said driving means is in operation and for releasing said driving connection above said predetermined torque, said preloaded brake means including means for biasing said brake toward braking position with a predetermined pressure to provide for release of said brake above said predetermined torque.

6. A driving mechanism including an electric motor and a driven member, and a preloaded single electromagnetic brake means adapted to be actuated on energization of said driving motor for providing a driving connection between said motor and said driven member below a predetermined torque and for releasing said driving connection above said predetermined torque all when said motor is energized.

7. A driving mechanism including an electric driving motor and a driven member, and an adjustably preloaded brake means adapted to be actuated on the energization of said motor for providing a driving connection between said motor and said driven member below a predetermined torque and for releasing said driving connection above said predetermined torque when said motor is energized, said brake being arranged to be released when said motor is deenergized thereby to release said driving connection.

8. A driving mechanism including an electric driving motor and a driven member, and an electrically controlled preloaded brake means operable in response to the energization of said motor for providing a driving connection between said motor and said driven member below a predetermined torque and for releasing said driving connection above said predetermined torque when said motor is energized, said brake being arranged to be released when said motor is deenergized thereby to release said driving connection.

9. A driving mechanism including an electric driving motor and a driven member, and an adjustably preloaded single brake means operable in response to the energization of said motor for providing a driving connection between said motor and said driven member below a predetermined torque and for releasing said driving connection above said predetermined torque when said motor is energized, said brake being arranged to be released when said motor is deenergized thereby to release said driving connection.

10. A driving mechanism including an electric driving motor and a driven member, and an electrically controlled preloaded single brake means operable in response to the energization of said motor for providing a driving connection between said motor and said driven member below a predetermined torque and for releasing said driving connection above said predetermined torque when said motor is energized, said brake being arranged to be released when said motor is deenergized thereby to release said driving connection.

11. A driving mechanism including an electric driving motor and a driven member, and an electrically operated preloaded single brake means operable in response to the energization of said motor for providing a driving connection between said motor and said driven member below a predetermined torque and for releasing said driving connection above said predetermined torque when said motor is energized, said brake being arranged to be deenergized when said motor is deenergized thereby to release said driving connection.

12. A driving mechanism including an electric driving motor and a driven member, and a resiliently preloaded single electromagnetic brake means operable in response to the energization of said motor for providing a driving connection between said motor and said driven member below a predetermined torque and for releasing said driving connection above said predetermined torque when said motor is energized, said electromagnetic brake being arranged to be deenergized when said motor is deenergized thereby to release said driving connection.

13. A driving mechanism including a driving motor and a driven member, means including a planetary gearing for providing a driving connection between said motor and said driven member, said planetary gearing including a gear adapted to be driven by said motor, a second gear, planet gears arranged in engagement with said driven and second gears and rotatably supported by said driven member, and preloaded means operable in response to energization of said motor for holding stationary said second gear below a predetermined torque to provide said driving connection and for releasing said driving connection above said predetermined torque, said preloaded brake means including means for biasing said brake toward braking position with a predetermined pressure to provide for release of said brake above said predetermined torque.

14. A driving mechanism including a driving motor and a driven member, means including a planetary gearing for providing a driving connection between said motor and said driven member, said planetary gearing including a sun gear adapted to be driven by said motor, a ring gear, planet gears arranged in engagement with said sun and ring gears and rotatably supported by said driven member, and preloaded means operable in response to energization of said motor for holding stationary said ring gear below a predetermined torque to provide said driving connection and for releasing said driving connection above said predetermined torque, said preloaded brake means including means for biasing said brake toward braking position with a predetermined pressure to provide for release of said brake above said predetermined torque.

15. A driving mechanism including a driving motor and a driven member, means including a planetary gearing for providing a driving connection between said motor and said driven member, said planetary gearing including a gear adapted to be driven by said motor, a second gear, planet gears arranged in engagement with said driven gear and said second gear and rotatably supported by said driven member, and preloaded means for holding stationary said second gear below a predetermined torque to provide said driving connection and for releasing said driving connection above said predetermined torque when said motor is energized, said second gear holding means being arranged to release said second gear when said motor is deenergized thereby to release said driving connection.

16. A driving mechanism including a driving motor and a driven member, means including a planetary gearing for providing a driving connection between said motor and said driven member, said planetary gearing including a sun gear adapted to be driven by said motor, a ring gear, planet gears arranged in engagement with said sun and ring gears and rotatably supported by said driven member, and means for holding stationary said ring gear below a predetermined torque to provide said driving connection and for releasing said driving connection above said predetermined torque when said motor is energized, said ring gear holding means being preloaded and arranged to release said ring gear when said motor is deenergized thereby to release said driving connection.

17. A driving mechanism including a driving means and a driven member, means including a planetary gearing for providing a driving connection between said driving means and said driven member, said planetary gearing including a sun gear adapted to be driven by said driving means, a ring gear, planet gears arranged in engagement with said sun and ring gears and rotatably supported by said driven member, and preloaded means for holding stationary said ring gear below a predetermined torque to provide said driving connection and for releasing said driving connection above said predetermined torque when said driving means is in operation, said preloaded ring gear holding means including means for biasing said brake toward braking position with a predetermined pressure to provide for release of said brake above said predetermined torque and being arranged to release said ring gear when said driving means is inoperative thereby to release said driving connection.

18. A driving mechanism including a driving means and a driven member, means including a planetary gearing for providing a driving connection between said driving means and said driven member, said planetary gearing including a gear adapted to be driven by said driving means, a second gear, planet gears arranged in engagement with said driven gear and said second gear and rotatably supported by said driven member, and preloaded means for holding stationary said second gear below a predetermined torque to provide said driving connection and for releasing said driving connection above said predetermined torque when said driving means is in operation, said preloaded second gear holding means including means for biasing said brake toward braking position with a predetermined pressure to provide for release of said brake above said predetermined torque and being arranged to release said second gear when said driving means is inoperative thereby to release said driving connection.

19. A driving mechanism including a driving means and a driven member, means including a planetary gearing for providing a driving connection between said driving means and said driven member, said planetary gearing including a sun gear adapted to be driven by said driving means, a ring gear, planet gears arranged in engagement with said sun and ring gears and rotatably supported by said driven member, and preloaded means for holding stationary said ring gear below a predetermined torque to provide said driving connection and for releasing said driving connection above said predetermined torque when said driving means is in operation, said preloaded ring gear holding means including means for biasing said brake toward braking position with a predetermined pressure to provide for release of said brake above said predetermined torque and being arranged to release said ring gear when said driving means is inoperative thereby to release said driving connection.

20. A driving mechanism including a driving means and a driven member, means including a planetary gearing for providing a driving connection between said driving means and said driven member, said planetary gearing including a sun gear adapted to be driven by said driving means, a ring gear, planet gears arranged in engagement with said sun and ring gears and rotatably supported by said driven member, and a preloaded electrically operated brake means operable in response to operation of said driving means for holding stationary said ring gear below a predetermined torque to provide said driving connection and for releasing said driving connection above said predetermined torque when said driving means is in operation, said preloaded brake including means for biasing said brake toward braking position with a predetermined pressure to provide for release of said brake above said predetermined torque and being arranged to release said ring gear when said driving means is inoperative thereby to release said driving connection.

21. A driving mechanism including a driving means and a driven member, means including a planetary gearing for providing a driving connection between said driving means and said driven member, said planetary gearing including a sun gear adapted to be driven by said driving means, a ring gear, planet gears arranged in engagement with said sun and ring gears and rotatably supported by said driven member, and a single resiliently preloaded electromagnetic brake means adapted to be actuated on operation of said driving means for holding stationary said ring gear below a predetermined torque to provide said driving connection and for releasing said driving connection above said predetermined torque when said driving means is in operation, said preloaded electromagnetic brake including means for biasing said brake toward braking position with a predetermined pressure to provide for release of said brake above said predetermined torque and being arranged to release said ring gear when said driving means is inoperative thereby to release said driving connection.

22. A driving mechanism including a driving means and a driven member, means including a planetary gearing for providing a driving connection between said driving means and said driven member, said planetary gearing including a sun gear adapted to be driven by said driving means, a ring gear, planet gears arranged in engagement with said sun and ring gears and rotatably supported by said driven member, and an electrically controlled preloaded means responsive to operation of said driving means for holding stationary said ring gear below a predetermined torque to provide said driving connection and for releasing said driving connection above said predetermined torque when said driving means is in operation, said preloaded ring gear holding means including means for biasing said brake toward braking position with a predetermined pressure to provide for release of said brake above said predetermined torque and being arranged to release said ring gear when said driving means is inoperative thereby to release said driving connection.

23. A power transmission mechanism, including a housing, a drive shaft rotatably supported therein, a driven shaft rotatably supported therein, a planetary gear mechanism interposed between the drive shaft and the driven shaft and including an element adapted to be held and released to establish and interrupt driving action between the drive shaft and the driven shaft, a friction disc brake structure associated with said last named element, means for actuating said brake structure to hold or release said element, and means for releasing said brake structure when an overload has been imposed upon the driven shaft.

24. A driving mechanism including an electric driving motor and a driven member, and an adjustably preloaded brake means responsive to the energization of said motor for providing a driving connection between said motor and said driven member below a predetermined torque and for releasing said driving connection above said predetermined torque when said motor is energized, said brake being arranged to be released when said motor is deenergized thereby to release said driving connection.

25. A driving mechanism including an electric driving motor and a driven member, and an adjustably preloaded single brake means acting coincidentally with the energization of said motor for providing a driving connection between said motor and said driven member below a predetermined torque and for releasing said driving connection above said predetermined torque when said motor is energized, said brake being arranged to be released when said motor is deenergized thereby to release said driving connection.

26. A driving unit, comprising a housing formed of a brake section and a gear section longitudinally aligned and connected along a plane normal to the longitudinal axis of the housing, a driven shaft rotatably mounted in the brake section of the housing, a drive shaft rotatably mounted in the gear section of the housing, a ring gear structure rotatably mounted in the brake section of the housing around the driven shaft, a friction brake associated therewith acting to hold the ring gear structure against rotation below a predetermined torque value, an oil seal disposed between the ring gear structure and the driven shaft, an oil seal disposed between the periphery of the ring gear and the housing whereby the brake will be maintained in a relatively dry compartment, a spider carried by the driven shaft and circumscribed by the ring gear, planetary gears carried by the spider and engaging the ring gear, a sun gear rotatably mounted upon the driven shaft and in mesh with the planetary gears, and a gear train within the gear section of the housing establishing a driving connection between the drive shaft and the sun gear.

27. A driving mechanism including an electric driving motor and a driven member, and an electrically controlled resiliently adjustably preloaded brake means responsive to the energization of said motor for providing a driving connection between said motor and said driven member below a predetermined torque and for releasing said driving connection above said predetermined torque when said motor is energized.

28. A driving mechanism including a driving means and a driven member, means including a planetary gearing for providing a driving connection between said driving means and said driven member, said planetary gearing including a sun gear adapted to be driven by said driving means, a ring gear, planet gears arranged in engagement with said sun and ring gears and rotatably supported by said driven member, and frictional means for holding stationary said ring gear below a predetermined torque to provide said driving connection and for releasing said driving connection above said predetermined torque when said driving means is in operation, said ring gear holding means being arranged to release said ring gear when said driving means is inoperative thereby to release said driving connection.

29. A driving mechanism including a driving means and a driven member, means including a planetary gearing for providing a driving connection between said driving means and said driven member, said planetary gearing including a sun gear adapted to be driven by said driving means, a ring gear, planet gears arranged in engagement with said sun and ring gears and rotatably supported by said driven member, and frictional means for holding stationary said ring gear below a predetermined torque to provide said driving connection and for releasing said driving connection above said predetermined torque when said driving means is in operation, said ring gear holding means being arranged to release said ring gear when said driving means is inoperative thereby to release said driving connection.

WAYNE J. MORRILL.

REFERENCES CITED

The following references are of record in the file of this patent:

UNITED STATES PATENTS

| Number | Name | Date |
|---|---|---|
| 2,106,603 | Jacques | Jan. 25, 1938 |
| 2,271,640 | Heintz | Feb. 3, 1942 |
| 2,303,637 | Heintz | Dec. 1, 1942 |
| 2,241,087 | Grizwold | May 6, 1941 |
| 1,122,924 | Henderson | Dec. 29, 1941 |
| 1,702,479 | Mosch | Feb. 19, 1929 |
| 1,708,941 | Dean | Apr. 16, 1929 |
| 2,086,030 | Hodgson et al. | July 6, 1937 |

FOREIGN PATENTS

| Number | Country | Date |
|---|---|---|
| 628,676 | Germany | Apr. 9, 1936 |